US009775219B2

(12) United States Patent
Ikehara et al.

(10) Patent No.: US 9,775,219 B2
(45) Date of Patent: Sep. 26, 2017

(54) MOBILE TERMINAL AND DEVICE CONTROL SYSTEM

(71) Applicant: Panasonic Intellectual Property Management Co., Ltd., Osaka (JP)

(72) Inventors: Masaaki Ikehara, Osaka (JP); Yoshihiko Matsukawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/042,580

(22) Filed: Feb. 12, 2016

(65) Prior Publication Data

US 2016/0270195 A1 Sep. 15, 2016

(30) Foreign Application Priority Data

Mar. 9, 2015 (JP) ................................ 2015-046472

(51) Int. Cl.
*H04B 10/00* (2013.01)
*H05B 37/02* (2006.01)
*H05B 33/08* (2006.01)

(52) U.S. Cl.
CPC ..... *H05B 37/0272* (2013.01); *H05B 33/0863* (2013.01)

(58) Field of Classification Search
CPC .............. H04B 10/116; H04B 10/1143; H04B 10/1149; H05B 33/0845; H05B 37/0272; H05B 33/0842
USPC ....... 398/172, 118, 119, 128, 130, 127, 131, 398/183, 186, 202, 193, 194, 195, 115; 315/312, 291, 294, 152, 307
See application file for complete search history.

(56) References Cited

U.S. PATENT DOCUMENTS

| | | | | |
|---|---|---|---|---|
| 8,699,887 B1 * | 4/2014 | Rothenberg | ......... | H04B 10/116 315/158 |
| 2015/0372753 A1 * | 12/2015 | Jovicic | ................ | H04B 10/116 398/172 |
| 2016/0028477 A1 * | 1/2016 | Jovicic | ................ | H04B 10/116 398/118 |

FOREIGN PATENT DOCUMENTS

| | | |
|---|---|---|
| JP | 2007-166526 A | 6/2007 |
| JP | 2007-201681 A | 8/2007 |
| JP | 2007-274052 A | 10/2007 |
| JP | 2007-295490 A | 11/2007 |
| JP | 2009-238399 A | 3/2008 |
| JP | 2011-154581 A | 8/2011 |

(Continued)

*Primary Examiner* — Hanh Phan
(74) *Attorney, Agent, or Firm* — Renner Otto Boisselle & Skaler, LLP

(57) ABSTRACT

A mobile terminal includes: an image capturer which captures a video of one or more lighting devices each transmitting identification information of the lighting device through visible light communication; an input device which obtains an indication from an operator; a wireless communicator which wirelessly communicates with lighting devices; and a controller which controls the image capturer, the input device, and the wireless communicator, wherein the controller detects, by analyzing a video obtained by the image capturer, identification information of a lighting device included in the video, and if the input device obtains an operation indication directed to the lighting device, transmits a control signal corresponding to the operation indication via the wireless communicator to the lighting device (at least one of the lighting devices) having the detected identification information.

10 Claims, 7 Drawing Sheets

(56) References Cited

FOREIGN PATENT DOCUMENTS

JP 2014-168137 A 9/2014

* cited by examiner (a)

(b)

MOBILE TERMINAL AND DEVICE CONTROL SYSTEM

CROSS REFERENCE TO RELATED APPLICATION

This application claims the benefit of priority of Japanese Patent Application Number 2015-046472 filed on Mar. 9, 2015, the entire content of which is hereby incorporated by reference.

BACKGROUND

1. Technical Field

The present disclosure relates to a mobile terminal and a device control system, and in particular to a mobile terminal which controls a device through wireless communication and a device control system.

2. Description of the Related Art

Conventionally, various techniques for a mobile terminal which controls a device through wireless communication have been proposed (for example, see Japanese Unexamined Patent Application Publication No. 2009-238399).

Japanese Unexamined Patent Application Publication. No. 2009-238399 discloses a lighting system which includes a plurality of lighting devices installed in an illumination space, a lighting controller which controls dimming of the plurality of lighting devices according to scenes, and a remote controller (mobile terminal) which makes scene settings for the lighting controller. According to this lighting system, based on an indication from the remote controller and an image obtained by an image capturer included in the lighting controller, a scene area where a scene is to be reproduced is located and the lighting devices are dimmed, thus automatically reproducing a scene at a place where a person is present.

SUMMARY

The technique disclosed in Japanese Unexamined Patent Application Publication No. 2009-238399, however, has a problem that a lighting device, which is a control target, cannot be controlled unless a dedicated mobile terminal (remote controller) is used for the lighting device. Accordingly, when a user wishes to dim the lighting device, the user needs to find the dedicated remote controller, which causes inconvenience when the lighting device is to be operated.

In view of this, the present disclosure provides a mobile terminal with improved usability, which controls a device through wireless communication, and a device control system which includes the mobile terminal.

In order to provide the aforementioned mobile terminal, a mobile terminal according to an aspect of the present disclosure is a mobile terminal including; an image capturer which captures a video of one or more visible light communication devices each transmitting identification information of the visible light communication device through visible light communication; an input device which obtains an indication from an operator; a wireless communicator which wirelessly communicates with the one or more visible light communication devices; and a controller which controls the image capturer, the input device, and the wireless communicator, wherein the controller detects, by analyzing a video obtained by the image capturer, identification information of a visible light communication device included in the video, and if the input device obtains an operation indication directed to the visible light communication device, transmits a control signal corresponding to the operation indication via the wireless communicator to the visible light communication device having the detected identification information.

Further, in order to provide the aforementioned device control system, a device control system according to an aspect of the present disclosure includes: a visible light communication device which transmits identification information of the visible light communication device through visible light communication; and the above-described mobile terminal which transmits a control signal to the visible light communication device.

Note that the present disclosure can be achieved not only as a mobile terminal and a device control system, but also as a program for achieving functions of a controller included in the mobile terminal and a computer-readable recording medium storing the program.

The present disclosure provides a mobile terminal with improved usability, which controls a device through wireless communication, and a device control system which includes the mobile terminal.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes embodiments of the present disclosure in detail, with reference to the drawings. Note that the embodiments described below each show a particular example. The numerical values, types of a device, mounting configurations, elements, the arrangement and connection of the elements, steps, the processing order of the steps, and the like described in the following embodiments are mere examples, and thus are not intended to limit the present disclosure. Thus, among the elements in the following embodiments, elements not recited in any of the independent claims defining the most generic part of the inventive concept of the present disclosure are described as arbitrary elements that firm exemplary embodiments.

Figure 1:
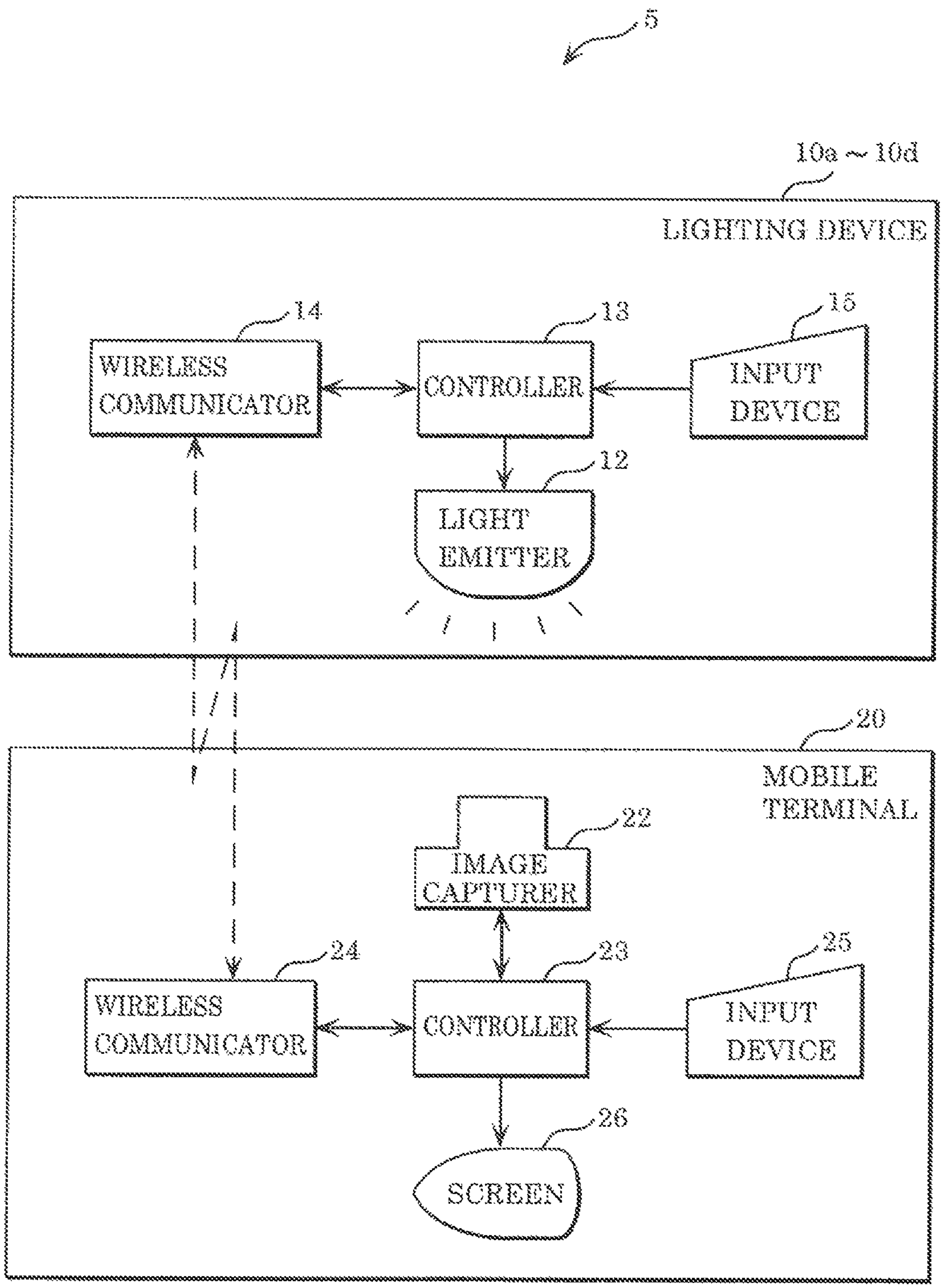
FIG. 1 is a block diagram illustrating a configuration of a device control system according to an embodiment of the present disclosure.

FIG. 1 is a block diagram illustrating a configuration of device control system 5 according to the present embodiment. Device control system 5 controls devices (here, visible light communication devices) through wireless communication, and includes one or more lighting devices which are control target devices (here, four lighting devices 10*a* to 10*d*) and mobile terminal 20.

Each of lighting devices 10*a* to 10*d* is an example of a visible light communication device which transmits identification information of the lighting device through visible light communication, and is a ceiling light, for example. Lighting devices 10*a* to 10*d* each include light emitter 12, controller 13, wireless communicator 14, and input device 15.

Light emitter 12 is a light source which emits illumination light, and is a light emitting diode (LED), for example.

Wireless communicator 14 is a communication interface which wirelessly communicates with mobile terminal 20, and is a wireless local area network (LAN) interface, for example.

Input device 15 is an input unit which obtains an indication from an operator, and is, for example, a remote controller or an operation button on a wall, for instance. Input device 15 may be coupled to controller 13 wirelessly thru a wireless interface or thru hard-wire, using any of various known techniques.

Controller 13 is a processing unit which controls light emitter 12, wireless communicator 14, and input device 15, and includes, for example, a microcomputer (processor) which has a program stored in non-volatile memory and an electronic circuit which, by executing the program, controls light emission (dimming and color control) of light emitter 12 as described herein. Controller 13 allows and interrupts power supply to light emitter 12, and controls (dimming and the color of light emitter 12, in accordance with an indication obtained by input device 15 and a control signal transmitted from mobile terminal 20 via wireless communicator 14. Further, controller 13 causes, by controlling light emitter 12, light emitter 12 to superimpose, on illumination light (the brightness of which is modulated digitally, for example), and transmit preset identification information of the lighting device in the form of a visible light signal.

Note that identification information may be any information which identifies an individual lighting device, and may be, for example, information stored in controller 13 in advance or information set by an operator by giving an indication via input device 15. Further, identification information may include an arbitrary letter or a communication address given to wireless communicator 14.

Mobile terminal 20 is a portable terminal device which controls lighting devices 10*a* to 10*d* through wireless communication, and is, for example, a smartphone or a tablet terminal. Mobile terminal 20 includes image capturer 22, controller 23, wireless communicator 24, input device 25, and screen 26.

Image capturer 22 is an example of an image capturing unit which captures a video of one or more visible light communication devices (here, lighting devices 10*a* to 10*d*) each transmitting identification information of the visible light communication device through visible light communication, and is, for example, an image sensor (e.g., complementary metal-oxide-semiconductor (CMOS) or charge-coupled-device (CCD) image sensor for a camera) which captures a video and a still image.

Wireless communicator 24 is an example of a wireless communication unit which wirelessly communicates with the one or more visible light communication devices (here, lighting devices 10*a* to 10*d*), and is a wireless LAN interface, for example.

Input device 25 is an input unit which obtains an indication from an operator, and is, for example, a touch panel provided on screen 26 of mobile terminal 20.

Screen 26 is a display unit for displaying an image, and is, for example, a liquid crystal display (LCD) panel.

Controller 23 is a processing unit which controls image capturer 22, wireless communicator 24, and input device 25, and includes, for example, a non-volatile memory storing a program such as an application (application software), a volatile memory serving as a workspace, and a processor which executes the program.

Controller 23 has the following distinctive functions. Note that in the present embodiment, a processor (such as a central processing unit (CPU) or microcontroller) included in controller 23 executes an application stored in non-volatile memory, thus achieving the functions of controller 23 described herein.

Controller 23 detects, by analyzing a video obtained by image capturer 22, identification information of a lighting device (here, at least one of lighting devices 10*a* to 10*d*) included in the video. If input device 25 obtains an operation, indication directed to the lighting device, controller 23 transmits a control signal corresponding to the obtained operation indication to the lighting device having the detected identification information (here, at least one of lighting devices 10*a* to 10*d*) via wireless communicator 24.

At this time, controller 23 displays, on screen 26, at least one image included in the video obtained by image capturer 22, receives, via input device 25, selection of a lighting device to be operated from the displayed image, and transmits the control signal to the selected lighting device.

Here, if image capturer 22 has captured images of a plurality of lighting devices, controller 23 detects identification information of a plurality of lighting devices included in a video obtained by image capturer 22 by analyzing the video. Controller 23 then receives, via input device 25, selection of at least one lighting device to be operated from among the plurality of lighting devices having the detected identification information, and transmits a control signal to the at least one selected lighting device.

Note that an association between identification information and a lighting device (a communication address of the lighting device) is obtained by referring to a communication address included in the identification information or a correspondence table of identification information and communication addresses of lighting devices, which is prestored in controller 23. Such a correspondence table may be registered in controller 23 when mobile terminal 20 is manufactured, or may be registered in controller 23 by an operator.

Figure 2:
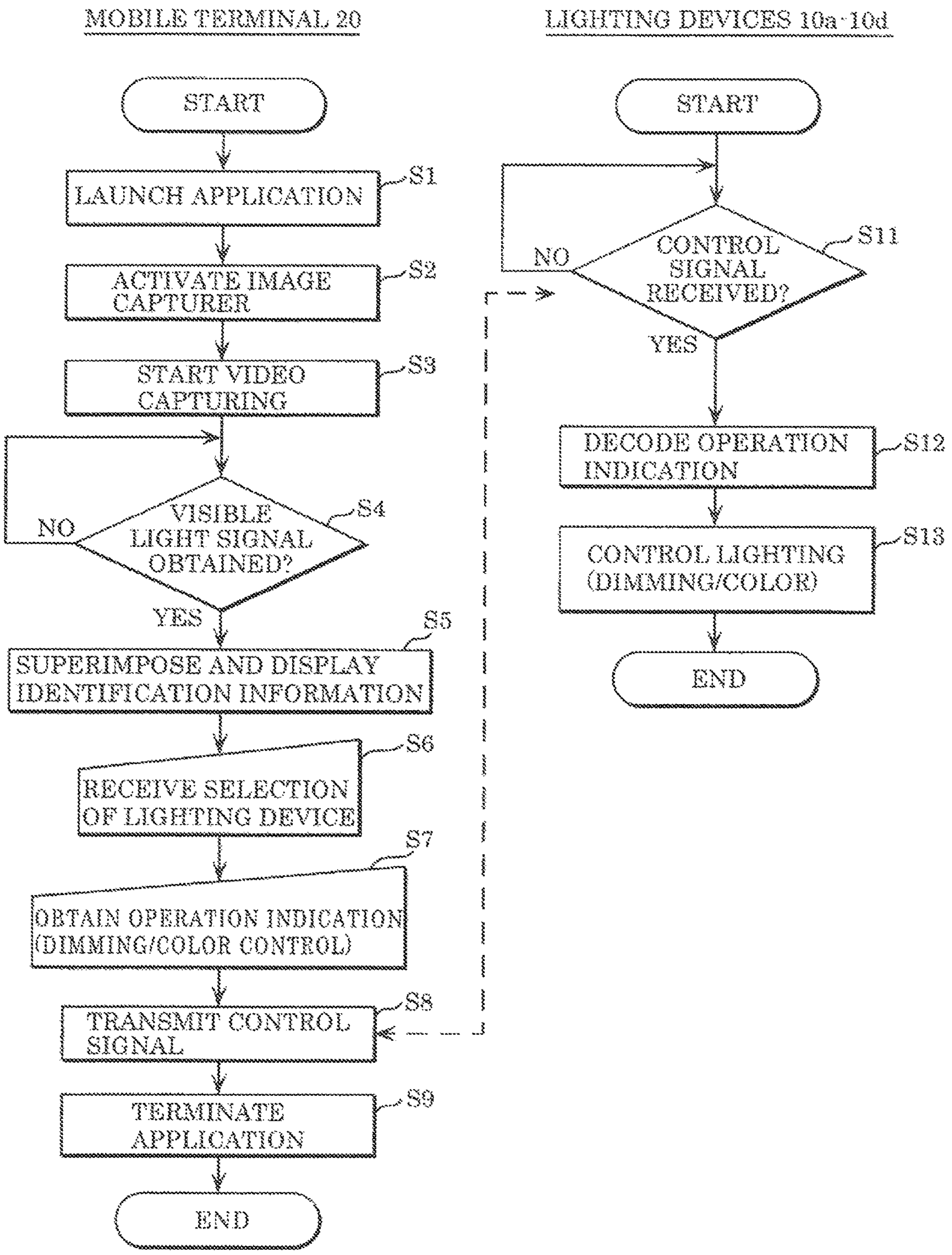
FIG. 2 is a flowchart illustrating operation of the device control system according to the embodiment of the present disclosure.
Figure 3:
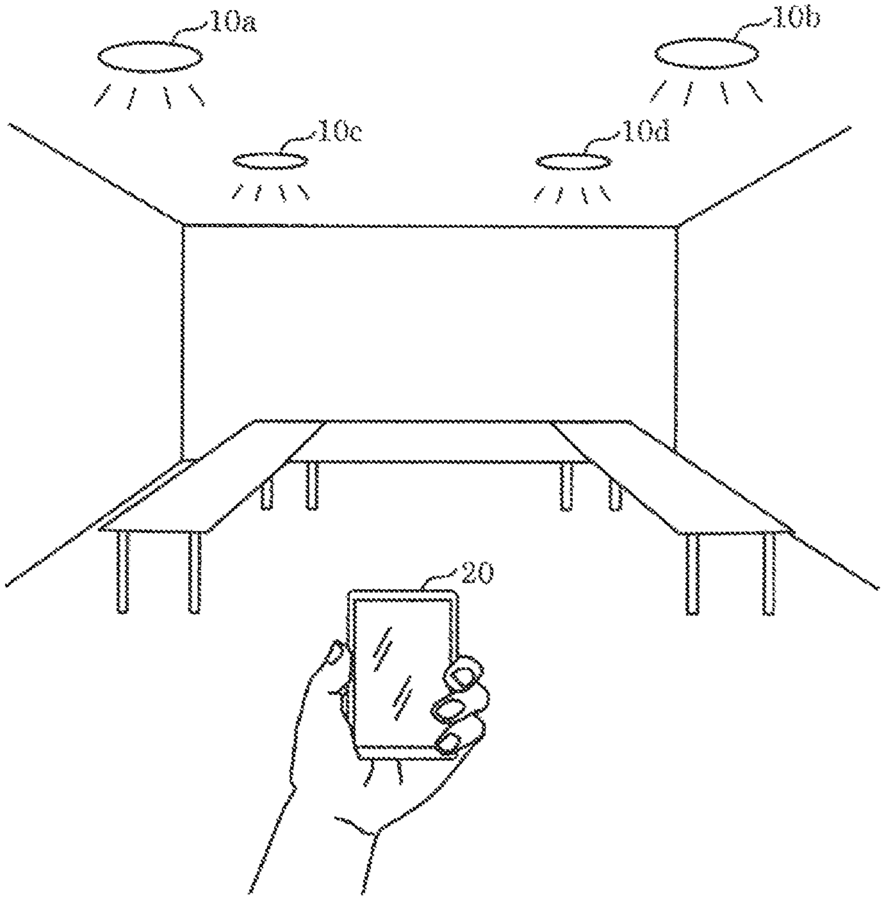
FIG. 3 is a diagram illustrating a state where an application is launched and video capturing is started in a mobile terminal of the device control system according to the embodiment of the present disclosure.
Figure 4:
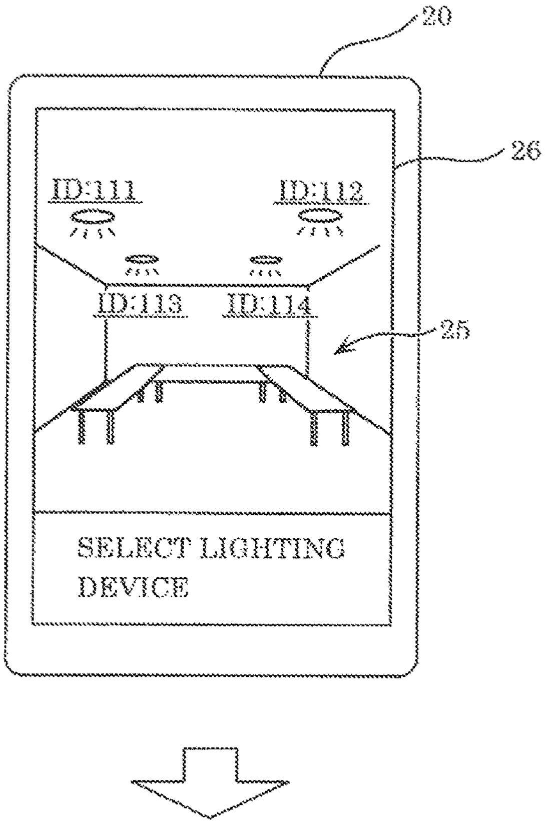
FIG. 4 is a diagram illustrating an example of display of a screen of the mobile terminal of the device control system according to the embodiment of the present disclosure.
Figure 4:
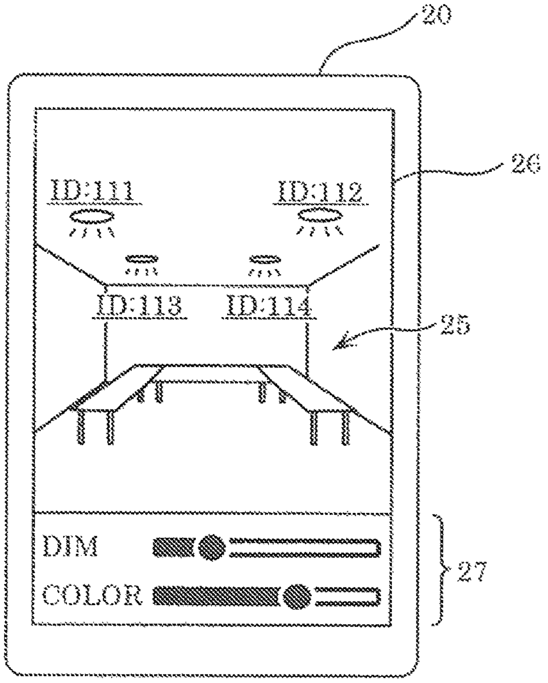

The following describes operation of device control system 5 having the above-described configuration according to the present embodiment, with reference to FIGS. 2 to 4.

FIG. 2 is a flowchart illustrating operation of device control system 5 according to the present embodiment. Here, FIG. 2 illustrates an operation procedure (S1 to S9) of mobile terminal 20, and a subsequently performed operation procedure (S11 to S13) of lighting devices 10*a* to 10*d*.

First, an operator launches an application according to the present embodiment by giving an indication from input device 25 of mobile terminal 20 (S1). Launching this application activates the above-described functions of controller 23 of mobile terminal 20.

Next, the operator starts video capturing using image capturer 22, by giving an indication via input device 25 of mobile terminal 20 (S2). This starts, under the control of controller 23, video capturing performed by image capturer 22 (S3), and displays the captured video on screen 26.

Note that video capturing may be automatically started (by controller 23), rather than manually, after the application is launched. When displaying a video, all the frames included in the captured video are not necessarily displayed, and decimated frames (at least one image included in the video) may be displayed.

FIG. 3 illustrates a state where an application is launched and video capturing is started in mobile terminal 20. Here, FIG. 3 illustrates a state where, in a room in which four lighting devices 10*a* to 10*d* are provided on the ceiling, an operator launches an application and starts video capturing with mobile terminal 20 to operate (here, at least one of dim and control colors of) lighting devices 10*a* to 10*d*.

When video capturing is started (S3), controller 23 of mobile terminal 20 determines whether a visible light signal has been obtained, by analyzing a video obtained by image capturer 22 (S4). For example, controller 23 determines a change in luminance at the frame rate of image capturer 22, by calculating, for each of the frames which constitute the video, average luminance of the entire frame or in predetermined block units (pixel aggregation units). Then, controller 23 determines from the change in luminance whether a visible light signal has been obtained.

More specifically, in the present embodiment, a visible light signal includes a synchronization pattern. Accordingly, controller 23 can determine whether a visible light signal has been obtained, by, for example, determining whether the change in luminance in at least a partial area of a video matches the synchronization pattern. Note that whether a visible light signal has been obtained may be determined based not only on the detection of the synchronization pattern included in the visible light signal, but also on the presence of identification information in the visible light signal. Whether information is identification information may be determined by detecting a specific visible light signal (i.e., a bit pattern) used in common with any type of identification information or by detecting whether the information matches identification information prestored in controller 23.

Controller 23 repeats this determination until controller 23 obtains a visible light signal (NO in S4), and if controller 23 determines that a visible light signal is obtained (YES in S4), controller 23 extracts identification information included in the obtained visible light signal, and superimposes, on the video, and displays, on screen 26, the extracted identification information (S5). In other words, controller 23 superimposes and displays the extracted identification information near a corresponding lighting device in a video displayed on screen 26. Such display is updated and repeated for each frame displayed on screen 26.

Note that a lighting device (or identification information) in a video is extracted by analyzing the video as follows. For example, controller 23 calculates, for each of the frames which constitute a video obtained by image capturer 22 or each of the resultant decimated frames, average luminance on a per area basis, the contour of which is extracted, or in predetermined block units. Accordingly, controller 23 determines a change in luminance at the frame rate of image capturer 22, and extracts identification information included in a visible light signal from the change in luminance. When identification information is extracted for each block, an area in which an image of one lighting device is captured is detected by collecting blocks having the same identification information. Controller 23 can extract the presence and the position of a lighting device by extracting a contour from the video or by locating an area in which identification information is detected from the video. Note that a method for extracting a lighting device (or identification information) from a video (a method of decoding a signal) is not limited to the method for calculating average luminance on the per area basis, the contour of which is extracted, or in predetermined block units, and may be another method for decoding a visible light signal using maximum luminance, for instance.

Part (a) of FIG. 4 illustrates an example of display of screen 26 of mobile terminal 20. Here, a video obtained by capturing an image of a room where four lighting devices 10*a* to 10*d* are provided on the ceiling is displayed on screen 26, with extracted identification information (ID: 111 to 114) being superimposed on the video at the four lighting devices (S5). Note that as illustrated in this example of display, controller 23 also displays, on the lower part of screen 26, a message for prompting operation, saying "Select lighting device".

Accordingly, if a captured video which includes the lighting devices and identification information, for instance, are displayed (S5), the operator selects a lighting device to operate (here, at least one of dim and control the color) by touching at least one of the lighting devices (here, four lighting devices (ID: 111 to 114)) in the video on the screen. Accordingly, controller 23 receives, via input device 25 (e.g., via operator touch of the touch screen), selection of a lighting device to be operated, from the image (here, video) displayed on screen 26 (S6).

Upon receipt of selection of a lighting device, controller 23 displays, on screen 26, operation panel 27 for obtaining an operation indication directed to at least one lighting device selected at this time, as illustrated in the example of display illustrated in (b) of FIG. 4 (lower part of screen 26). Here, operation panel 27 includes slide bars for dimming and color control displayed on screen 26. Note that if controller 23 receives selection of a lighting device in a video, to show on screen 26 that the device is being selected, controller 23 may highlight the selected lighting device such as by displaying a frame surrounding the selected lighting device and/or identification information of the lighting device or changing the color of the lighting device and/or the identification information.

Then, controller 23 obtains the indication given to operation panel 27 via input device 25 by receiving operation on operation panel 27 via screen 26 (here, by slide operation of dimming and color slide bars) (S7). Then, controller 23 transmits, to lighting devices 10*a* to 10*d*, a control signal corresponding to the obtained indication (S8).

Specifically, if the slide bar for dimming is operated this time on operation panel 27, controller 23 generates a control signal indicating the type of control (here, dimming) and a dimming level shown by the slide bar. Then, controller 23 obtains a communication address of the selected lighting device (at least one of lighting devices 10*a* to 10*d*), from the identification information of the lighting device. More specifically, if the identification information obtained via the visible light signal (S4) includes the communication address of the lighting device, controller 23 obtains the communication address of the lighting device by extracting the communication address from the identification information. Further, if the identification information does not include the communication address of the lighting device, controller 23 obtains the communication address associated with the identification information of the lighting device, by referring to the association table which is stored in controller 23 and includes identification information and communication addresses associated in advance. Controller 23 notifies wireless communicator 24 of the communication address obtained in this manner to transmit the generated control signal to a lighting device selected by the operator (at least one of lighting devices 10*a* to 10*d*).

After that, controller 23 terminates the application which has been run by then (S9).

Controller 13 of each of lighting devices 10*a* to 10*d* monitors whether a control signal has been received from mobile terminal 20 via wireless communicator 14 (S11).

If controller 13 detects reception of a control signal (YES in S11), controller 13 decodes the received control signal (S12), and controls (here, at least one of dimming and color control of) light emitter 12, according to the result of decoding (S13). For example, controller 13 determines the type of control (for example, dimming) and the dimming level by decoding the control signal, and causes light emitter 12 to emit light at the determined dimming level by controlling light emitter 12.

Figure 5:
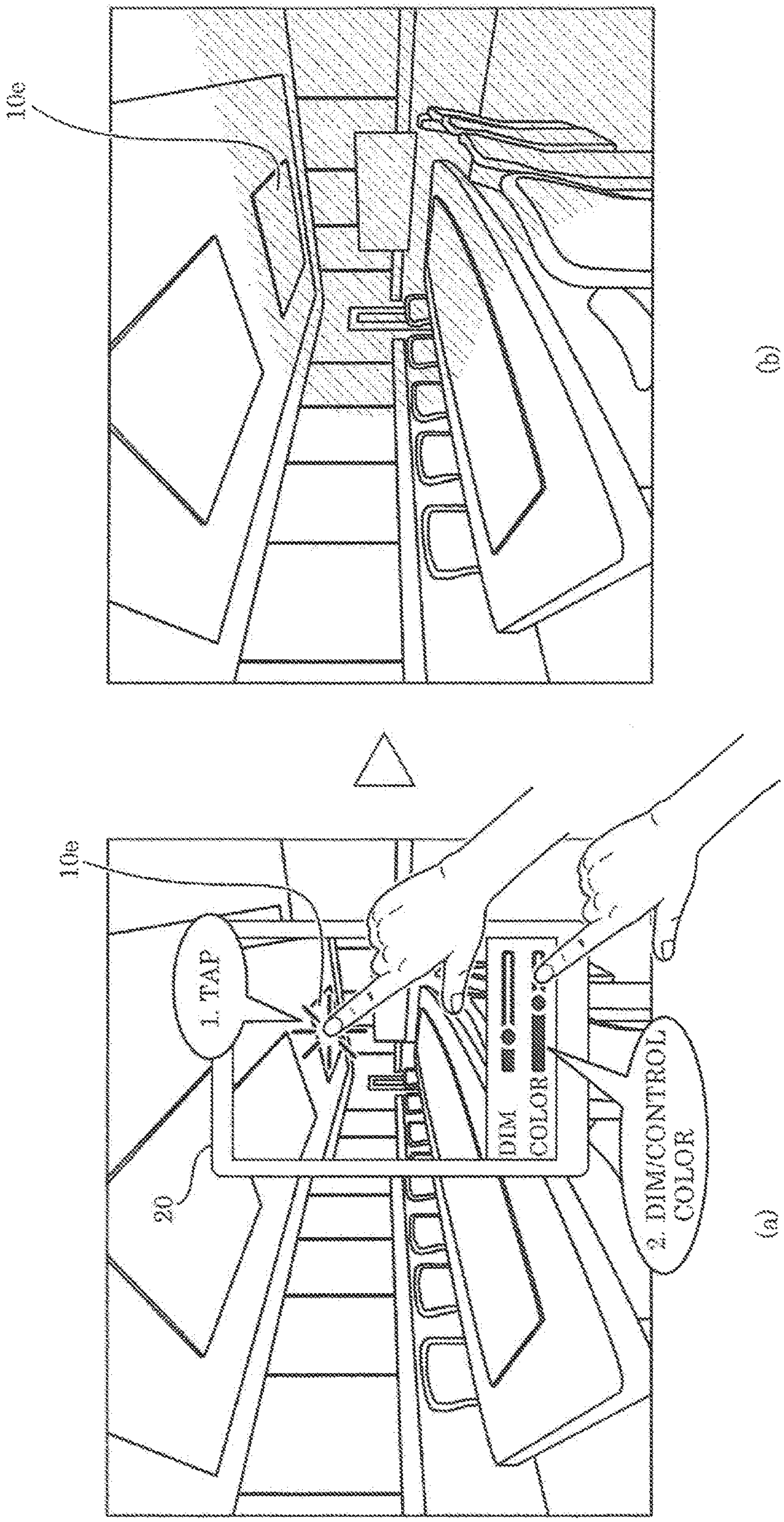
FIG. 5 is a diagram illustrating an example of operation of the mobile terminal of the device control system according to the embodiment of the present disclosure.

Following the above processing procedure, the operator captures a video of lighting devices 10*a* to 10*d* at least one of which is to be operated, using mobile terminal 20, and can operate the lighting device(s) in a desired manner by making a touch operation on the video displayed on screen 26, as illustrated in FIG. 5.

FIG. 5 illustrates an example of operation using mobile terminal 20 according to the present embodiment. In this example of operation, an operator captures a video of one of the lighting devices (lighting device 10*e*) provided in a meeting room using mobile terminal 20, and by making a touch operation on the video displayed on screen 26 (as in (a) of FIG. 5), the operator dims lighting device 10*e* (here, lowers the brightness of lighting device 10*e*) (as in (b) of FIG. 5).

As described above, according to device control system 5 according to the present embodiment, the operator can remotely control a given lighting device by merely capturing an image of the lighting device to be operated and giving an operation indication to the lighting device, using an operator's own mobile terminal 20 such as a smartphone. Thus, mobile terminal 20 can be used as a virtual remote controller of a given lighting device to be operated, without using a dedicated remote controller, thus improving operability of a lighting device. Further, the operator can check the illumination state of a lighting device displayed on screen 26 (or the actual lighting device) while operating operation panel 27 displayed on screen 26, and thus can reliably make desired operation for adjusting dimming and color control, for instance.

Figure 6:
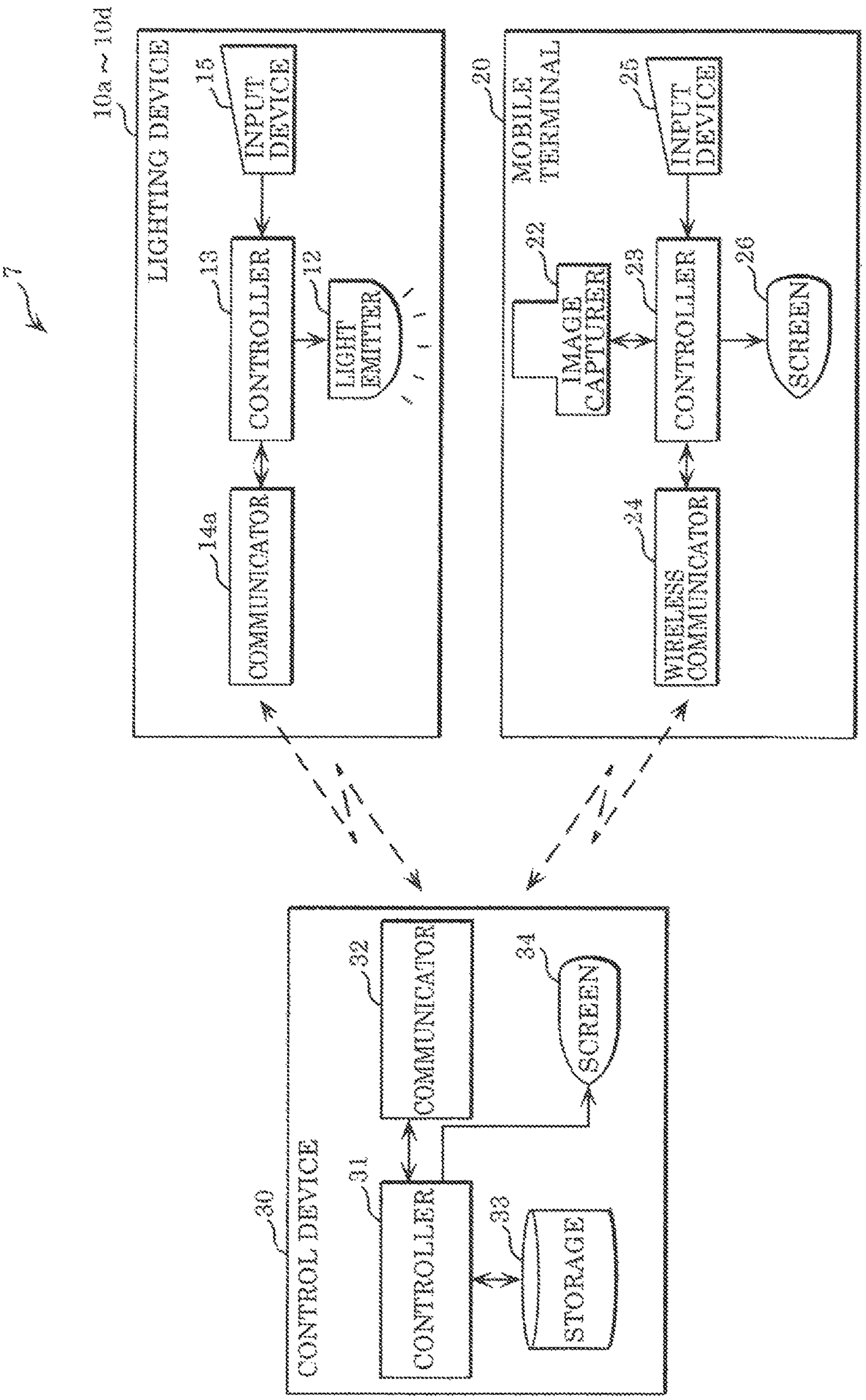
FIG. 6 is a block diagram illustrating a configuration of a device control system according to a variation of the embodiment of the present disclosure.

Note that the device control system according to the present disclosure is not limited to a system in which lighting devices 10*a* to 10*d* and mobile terminal 20 directly communicate with one another, as described in the above embodiment. For example, as illustrated in FIG. 6, lighting devices 10*a* to 10*d* and mobile terminal 20 may communicate with one another via control device 30. FIG. 6 is a block diagram illustrating a configuration of device control system 7 according to a variation of the embodiment according to the present disclosure. Device control system 7 includes control device 30, in addition to lighting devices 10*a* to 10*d* and mobile terminal 20 according to the above embodiment.

Control device 30 is a device which relays communication between mobile terminal 20 and lighting devices 10*a*, to 10*d*, and includes controller 31, communicator 32, storage 33, and screen 34. Controller 31 is a processing unit which controls communicator 32, storage 33, and screen 34, and includes, for example, a microcomputer (processor) which includes a program. Communicator 32 is a communication interface which communicates with lighting devices 10*a* to 10*d* by wire or wireless, and wirelessly communicates with mobile terminal 20. Communicator 32 is a wireless LAN interface, for example. Storage 33 is a memory storing various pieces of data, and is, for example, a non-volatile memory storing a wiring diagram of a room where lighting devices 10*a* to 10*d* are provided. Screen 34 is a display which shows various pieces of information to an operator.

Note that in this variation, lighting devices 10*a* to 10*d* each include communicator 14*a* which communicates with control device 30 by wire or wireless (selection of wire or wireless can be made based on a setting made in advance and the wiring), instead of wireless communicator 14 according to the above embodiment. Communicator 14*a* is a wired or wireless LAN interface, for example. If communication between control device 30 and lighting devices 10*a* to 10*d* is communication by wire, an advantage that reliability of communication can be secured with ease is achieved, whereas if the communication is wireless communication, an advantage that construction work is readily conducted is achieved.

According to device control system 7 according to this variation having such a configuration, mobile terminal 20 communicates with lighting devices 10*a* to 10*d* via control device 30. In other words, wireless communicator 24 of mobile terminal 20 communicates with lighting devices 10*a* to 10*d*, through wireless communication with control device 30 which relays communication between mobile terminal 20 and lighting devices 10*a* to 10*d*. Furthermore, giving various functions to control device 30 achieves various applications.

Figure 7:
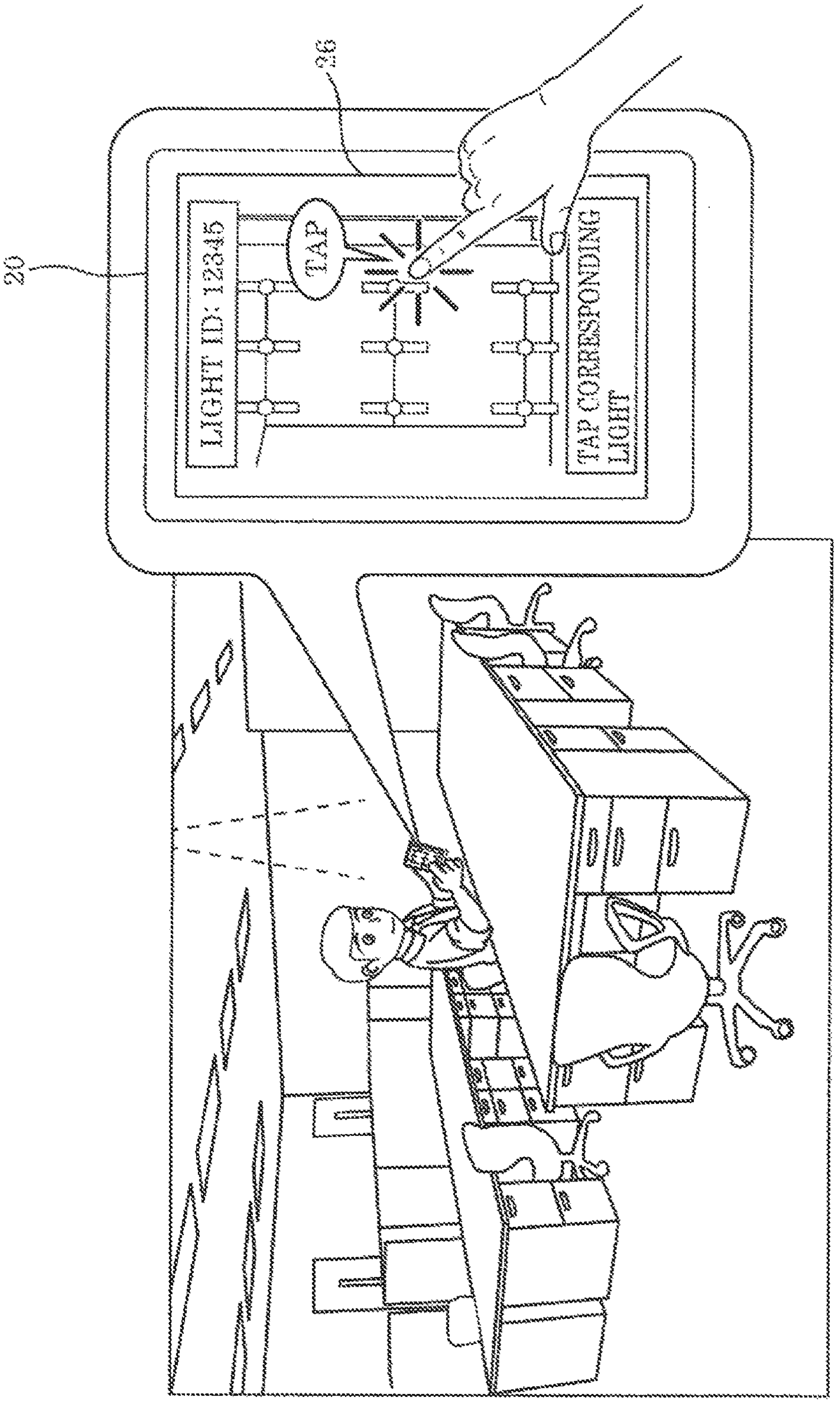
FIG. 7 is a diagram illustrating an example of display of a screen of a mobile terminal of the device control system according to the variation of the embodiment of the present disclosure.

For example, as illustrated in FIG. 7, a wiring diagram (electrical diagram) of lighting devices 10*a* to 10*d* is displayed on screen 26 of mobile terminal 20, instead of a video obtained by capturing lighting devices 10*a* to 10*d*. FIG. 7 illustrates an example of display of screen 26 of mobile terminal 20 in device control system 7 according to this variation. An operator selects a lighting device to be operated, from the wiring diagram displayed on screen 26 of mobile terminal 20, and operates to, for instance, turn on the selected lighting device.

More specifically, in control device 30, controller 31 obtains, from mobile terminal 20 via communicator 32, identification information of lighting devices 10*a* to 10*d* included in the video captured by mobile terminal 20. Controller 31 identifies the wiring diagram (a part of the wiring diagram) for lighting devices 10*a* to 10*d* in an image captured with mobile terminal 20, by comparing identification information of lighting devices included in the wiring diagram stored in storage 33 with the identification information obtained, from mobile terminal 20. Controller 31 transmits the identified wiring diagram to mobile terminal 20 via communicator 32. Mobile terminal 20 displays, on screen 26, the wiring diagram transmitted from control device 30. Here, if the operator operates a lighting device included in the wiring diagram displayed on screen 26 by, for instance, touching the lighting device, mobile terminal 20 transmits, to control device 30, identification information of the touched lighting device and an operation indication from the operator. In control device 30 which has obtained the identification information of the lighting device and the operation indication from the operator, controller 31 controls, according to the operation indication, the lighting device having the identification information obtained at this time, through the control of lighting devices 10*a* to 10*d* via communicator 32. In this manner, the operator captures an image of lighting devices 10*a* to 10*d* with mobile terminal 20, and the wiring diagram for lighting devices 10*a* to 10*d* is displayed on screen 26. Then, the operator can remotely control lighting devices 10*a* to 10*d* using the wiring diagram.

Note that in this variation, as stated above, control device 30 and lighting devices 10*a* to 10*d* may communicate by wireless or wire. As long as mobile terminal 20 and control device 30 communicate wirelessly, the convenience of mobile terminal 20 in device control system 7 according to this variation is secured.

Further, although the wiring diagram of lighting devices 10*a* to 10*d* is displayed on screen 26 of mobile terminal 20 in this variation, instead of a video obtained by capturing lighting devices 10*a* to 10*d*, device control system according to this variation is not the limited one to provide such display. In device control system 5 which includes lighting devices 10*a* to 10*d* and mobile terminal 20 as in the above embodiment, a wiring diagram of lighting devices 10*a* to 10*d* may be displayed on screen 26 of mobile terminal 20, instead of a video of lighting devices 10*a* to 10*d*. In other words, the functions of control device 30 according to this variation may be included in the application executed in mobile terminal 20.

As described above, according to the embodiment and the variation described above, mobile terminal 20 includes: image capturer 22 which captures a video of a lighting device transmitting identification information of the lighting device through visible light communication; input device 25 which obtains an indication from an operator; wireless communicator 24 which communicates with lighting devices 10*a* to 10*d* by wireless; and controller 23 which controls image capturer 22, input device 25, and wireless communicator 24. Controller 23 detects the identification information of the lighting device included in the video obtained by image capturer 22 by analyzing the video. If input device 25 obtains an operation indication directed to the lighting device, controller 23 transmits a control signal corresponding to the operation indication via wireless communicator 24 to the lighting device (at least one of lighting devices 10*a* to 10*d*) having the detected identification information.

In this manner, a video of lighting devices 10*a* to 10*d* to be operated is captured using mobile terminal 20, to identify a lighting device which the operator desires to operate. Accordingly, the operator does not need to perform troublesome operations such as finding a dedicated remote controller and pairing the lighting device to be controlled and a mobile terminal so that the lighting device and the mobile terminal can communicate, thus achieving a mobile terminal which controls a lighting device and has higher usability than a conventional mobile terminal.

Here, mobile terminal 20 further includes screen 26. Controller 23 displays, on screen 26, at least one image included in a video obtained by image capturer 22, and receives, via input device 25, selection of a lighting device to be operated from the at least one displayed image. Controller 23 transmits the control signal to the selected lighting device (at least one of lighting devices 10*a* to 10*d*).

In this manner, the operator can select a lighting device to operate while looking at the image showing the actual state, and thus selection of a lighting device to be operated can be reliably selected in a simple manner.

Controller 23 detects, by analyzing a video obtained by image capturer 22, identification information of a plurality of lighting devices included in the video. Controller 23 receives, via input device 25, selection of at least one lighting device to be operated from among the plurality of lighting devices having the detected identification information, and transmits the control signal to the at least one selected lighting device (at least one of lighting devices 10*a* to 10*d*).

Accordingly, in a state where plural lighting devices are provided, even if only one or more of the lighting devices are to be operated, the operator can select a lighting device to operate while looking at the image showing the actual state, and thus can reliably select a lighting device to operate in a simple manner.

Controller 23 further superimposes, on the at least one image, and displays, on screen 26, identification information of a lighting device included in the at least one image.

Accordingly, the operator can select a lighting device to operate while checking not only a lighting device included in the image, but also identification information of the lighting device, and thus can reliably select a lighting device to operate in a simple manner.

Controller 23 further displays, on screen 26, operation panel 27 for obtaining details of the operation indication, obtains an indication given to operation panel 27 via input device 25. Controller 23 transmits a control signal corresponding to the obtained indication to the lighting device (at least one of lighting devices 10*a* to 10*d*) to which the operation indication is directed.

Accordingly, the operator can provide an operation indication directed to a lighting device by operating operation panel 27 displayed on screen 26. Thus, the operator can use mobile terminal 20 such as a smartphone, as a remote controller (virtual remote controller) of a lighting device, and consequently convenience of the operation improves.

The above has described the mobile terminal and the device control system according to the present disclosure, based on the embodiment and the variation, the present disclosure is not limited to the embodiment and the variation. The scope of the present disclosure includes various modifications, which may be conceived by those skilled in the art, to the embodiment and the variation or forms constructed by combining some elements in the embodiment and the variation, without departing from the gist of the present disclosure.

For example, the embodiment and the variation have described a lighting device as a visible light communication device, but the present disclosure is not limited to this. Any type of a device that has the function of transmitting a visible light signal and the function of external control by wireless communication may serve as the visible light communication device, and examples of such a device include an air-conditioner and a television. For example, in a large electronics store where many televisions are on display, an image of a television, the brightness of which is to be controlled, is captured using image capturer 22 of mobile terminal 20, and the image and operation panel 27 that are displayed on screen 26 are operated, thus adjusting the brightness of the target television.

Further, in the above embodiment, although a video is displayed on screen 26 when video capturing is started in mobile terminal 20, the image displayed on screen 26 may be a still image (for example, one image obtained by video capturing). The reason for this is that if a still image is displayed on screen 26 when the direction in which capturing by image capturer 22 of mobile terminal 20 does not change, it is easier to select a lighting device from the still image. Note that it is necessary to recognize identification information transmitted through visible light communication even if a still image is displayed on screen 26, and thus the operation mode of image capturer 22 is a video capturing mode.

Further, although operation panel 27 of mobile terminal 20 is described above as being displayed after a lighting device to be operated is selected in the above embodiment (FIG. 4), operation panel 27 may be displayed before a lighting device is selected in accordance with an alternative embodiment. For example, controller 23 may display operation panel 27 on screen 26 after mobile terminal 20 detects a visible light signal or extracts identification information and before a lighting device is selected.

Further, if a plurality of lighting devices are selected, operation panel 27 displayed on screen 26 functions as a common operation panel to the lighting devices in the above embodiment; however, the present disclosure is not limited to this. Individual operation panels for the lighting devices extracted from the captured video may be displayed, and an operator may operate the operation panels for the Lighting devices individually. In this case, for each operation panel, controller 23 generates a control signal corresponding to an operation indication, and transmits the control signal to the lighting device corresponding to the operation panel. Thus, the lighting devices can be independently adjusted.

Further, the present disclosure can be achieved as other than mobile terminal 20, control device 30, device control system 5, and device control system 7 according to the embodiment and the variation. The present disclosure may be achieved as a program (an application in the above embodiment) for achieving the functions of controller 23 of mobile terminal 20, or may be achieved as a computer-readable recording medium storing the program, such as a DVD.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended, by the following claims to claim any and all modifications and variations that fall within the true scope of the present teachings.

What is claimed is:

1. A mobile terminal comprising:

an image capturer which captures a video of one or more visible light communication devices each transmitting identification information of the visible light communication device through visible light communication;

an input device which obtains an indication from an operator;

a wireless communicator which wirelessly communicates with the one or more visible light communication devices;

a controller which controls the image capturer, the input device, and the wireless communicator; and a screen, wherein the controller detects, by analyzing the video obtained by the image capturer, identification information of a visible light communication device included in the video, and upon receiving an operation indication directed to the visible light communication device having the detected identification information, via the input device, transmits a control signal corresponding to the operation indication via the wireless communicator to the visible light communication device having the detected identification information, and the controller displays, on the screen, at least one image included in the video used to detect the identification information, receives, via the input device, selection of a visible light communication device to be operated from the at least one displayed image, and transmits the control signal corresponding to the operation indication to a visible light communication device identified by the identification information of the selected visible light communication device.

2. The mobile terminal according to claim 1, wherein the controller detects, by analyzing a video obtained by the image capturer, identification information of a plurality of visible light communication devices included in the video, receives, via the input device, selection of at least one visible light communication device to be operated from among the plurality of visible light communication devices having the detected identification information, and transmits the control signal to the at least one selected visible light communication device.

3. The mobile terminal according to claim 1, wherein the controller further superimposes, on the at least one image, and displays, on the screen, identification information of a visible light communication device included in the at least one image.

4. The mobile terminal according to claim 1, wherein the controller further displays, on the screen, an operation panel for obtaining details of the operation indication, obtains an indication given to the operation panel via the input device, and transmits a control signal corresponding to the obtained indication to the visible light communication device to which the operation indication is directed.

5. The mobile terminal according to claim 1, wherein each of the one or more visible light communication devices is a lighting device, and the operation indication involves at least one of dimming and color control of the lighting device.

6. The mobile terminal according to claim 1, wherein the wireless communicator communicates with the one or more visible light communication devices through wireless communication with a control device which relays communication between the mobile terminal and the one or more visible light communication devices.

7. A device control system comprising:

a visible light communication device which transmits identification information of the visible light communication device through visible light communication; and the mobile terminal according to claim 1 which transmits a control signal to the visible light communication device.

8. The mobile terminal according to claim 1, wherein the screen is a touch panel, and the touch panel incorporates the input device.

9. A non-transitory computer-readable medium having a program stored thereon, which, when executed by a processor included in a mobile terminal, carries out operations of:

controlling an image capturer within the mobile terminal which captures a video of one or more visible light communication devices each transmitting identification information of the visible light communication device through visible light communication;

detecting, by analyzing the video obtained by the image capturer, identification information of a visible light communication device included in the video;

receiving an operation indication directed to the visible light communication device having the detected identification information, via an input device included in the mobile terminal;

transmitting a control signal corresponding to the operation indication via a wireless communicator included in the mobile terminal to the visible light communication device having the detected identification information, and displaying, on a screen, at least one image included in the video used to detect the identification information, receiving, via the input device, selection of a visible light communication device to be operated from the at least one displayed image, and transmitting the control signal corresponding to the operation indication to a visible light communication device identified by the identification information of the selected visible light communication device.

10. The non-transitory computer-readable medium according to claim 9, wherein the screen is a touch panel, and the touch panel incorporates the input device.

* * * * *